United States Patent
Johnson

(10) Patent No.: US 9,469,485 B2
(45) Date of Patent: Oct. 18, 2016

(54) DEVICE FOR ALIGNMENT OF ELONGATED FOOD PRODUCTS

(71) Applicant: Trosterud Mekaniske Verksted AS, Oslo (NO)

(72) Inventor: Gisle Espolin Johnson, Oslo (NO)

(73) Assignee: Trosterud Mekaniske Verksted AS, Oslo (NO)

( * ) Notice: Subject to any disclaimer, the term of this patent is extended or adjusted under 35 U.S.C. 154(b) by 0 days.

(21) Appl. No.: 14/655,491

(22) PCT Filed: Dec. 17, 2013

(86) PCT No.: PCT/EP2013/076988
§ 371 (c)(1),
(2) Date: Jun. 25, 2015

(87) PCT Pub. No.: WO2014/102093
PCT Pub. Date: Jul. 3, 2014

(65) Prior Publication Data
US 2015/0353295 A1 Dec. 10, 2015

(30) Foreign Application Priority Data

Dec. 28, 2012 (NO) .................................... 20121563

(51) Int. Cl.
| | |
|---|---|
| *B07C 5/00* | (2006.01) |
| *B65G 47/52* | (2006.01) |
| *G05B 19/402* | (2006.01) |
| *B65B 19/34* | (2006.01) |

(Continued)

(52) U.S. Cl.
CPC ............... *B65G 47/52* (2013.01); *B65B 19/34* (2013.01); *B65B 35/38* (2013.01); *B65G 47/082* (2013.01); *B65G 47/642* (2013.01); *B65G 47/71* (2013.01); *G05B 19/402* (2013.01); *G05B 2219/45111* (2013.01)

(58) Field of Classification Search
CPC ................................ B65G 47/71; B65G 47/88
See application file for complete search history.

(56) References Cited

U.S. PATENT DOCUMENTS 3,979,878 A * 9/1976 Berney .................. B65B 35/30
53/495
5,057,055 A * 10/1991 Michaud ................ B65B 19/34
452/182

(Continued)

FOREIGN PATENT DOCUMENTS

| DE | 4446437 A1 | 7/1996 |
|---|---|---|
| EP | 0027876 A1 | 5/1981 |

(Continued)

OTHER PUBLICATIONS

Jagusiak, Antony, "International Search Report," prepared for PCT/EP2013/076988, as mailed Jun. 16, 2014, three pages.

*Primary Examiner* — Terrell Matthews
(74) *Attorney, Agent, or Firm* — Winstead PC

(57) ABSTRACT

A device (1) for alignment of elongated food products to be further processed, wherein the device comprises an incoming product conveyor (21) for transporting incoming elongated products into the device, a displacement device (23) displaceable arranged on a displacement track (29) for relocating the incoming products from the incoming product conveyor (21) onto an outgoing product conveyor (26) having capacity for arranging two or more incoming products (20') side by side, before transporting the two or more incoming products simultaneously out from the device, is described.

3 Claims, 4 Drawing Sheets

(51) Int. Cl.
*B65B 35/38* (2006.01)
*B65G 47/08* (2006.01)
*B65G 47/64* (2006.01)
*B65G 47/71* (2006.01)

(56) References Cited

U.S. PATENT DOCUMENTS 6,467,606 B1 * 10/2002 Elent .................. B65G 47/71
 198/370.1
7,980,381 B2 * 7/2011 Trejo .................. B65G 47/71
 198/443
2009/0057098 A1 * 3/2009 Helgi .................. A22C 25/08
 198/351

FOREIGN PATENT DOCUMENTS

| EP | 0174596 A1 | 3/1986 |
| EP | 0480436 A2 | 4/1992 |
| GB | 2368830 A | 5/2002 |
| WO | WO-2012028970 A1 | 3/2012 |

* cited by examiner

DEVICE FOR ALIGNMENT OF ELONGATED FOOD PRODUCTS

TECHNICAL FIELD

The present invention relates to improvements in handling of elongated objects of foodstuff for downstream slicing of the foodstuff objects. More specifically, the invention relates to handling of industry size cylinder shaped foodstuff, such as sausages of salami, cured meat, dried meat, and other kind of sausage like foodstuff as ham, etc, having a substantially circular or polygonal cross section, and to align the cylinder shaped objects for efficient cutting in a downstream process.

BACKGROUND ART

Food products of the above identified type typically have a length of 0.5 to 4 meters, such as 1.2 to 1.6 meters, and a diameter or cross section from 5 cm to 20 cm, such as 8 to 12 cm, and are prepared by different well known methods. Normally, the mentioned sausage shaped, or cylindrical food products are prepared in a mould and/or inside a sausage skin made of a permeable or impermeable material depending on the specific need, and is treated to give the required flavour, consistency, humidity etc. as required for the finished product.

Before entering the sliding process, the skin is stripped of the food, either manually or by means of well known machines, cutting the skin along the food product, the skin is gripped and is stripped off.

The stripped of food product are then introduced into the cutting equipment, either individually, or most common, two or more of the elongated food products are lifted onto an alignment table and aligned manually. Products that are damaged in a way that is not consistent with requirements for the sliced products, or from which remains of skin is left at the surface thereof, is manually sorted out and taken care of for alternative handling.

The aligning and sorting out of products not fulfilling the requirements for introduction into the slicing part of the process, is a labour intensive process, including a lot of lifting of heavy products.

A sausage packing machine is described in U.S. Pat. No. 5,057,055. Sausages are introduced individually into a conveyor and aligned in a side by side transverse alignment relationship. A transfer device is provided to transfer a predetermined number of transversely aligned sausages for packaging.

U.S. Pat. No. 3,979,878, EP0027876 and EP0174596 relate to alternative solutions for alignment of containers, packages of goods, or the like for packing into packages comprising two or more of the containers, packages or the like.

An object of the present invention is to improve the sorting and alignment part of the process from finished elongated food products, such as cured meat sausages, etc., as mentioned above, to sliced products prepared for sale, and make this process step less labour intensive.

An object of the present invention is to provide an automated device for alignment and sorting of elongated food products overcoming the problems mentioned above. Additional objects will be apparent for the skilled person reading the present description.

SUMMARY OF INVENTION

The present invention relates to a device for alignment of elongated food products to be further processed, the device comprising an incoming product conveyor for transporting incoming elongated products into the device, a displacement device being displaceable arranged on a displacement track for relocating the incoming products from the incoming product conveyor onto an outgoing product conveyor having capacity for arranging two or more incoming products side by side, before transporting the two or more incoming products simultaneously out from the device, wherein retractable guides are arranged above the outgoing products conveyor, the retractable guides being arranged to guide individual product on the outgoing products conveyor.

The present device allows for automated alignment of elongated food products such as cured sausages etc., with no or little manual work, and makes it possible to avoid hard manual work in difficult working positions often found in the plants of this kind.

According to one embodiment, the retractable guides are retractable to allow relocation of the incoming product from the incoming product conveyor to the outgoing product conveyor by means of the displacement device.

According to another embodiment, the displacement device is provided with a control device designed to controlled to relocate incoming products to be rejected in a reject product position to be collected by a reject collector for transport out from the device. This control means allowing relocating the elongated product to a separate reject collector for handling of rejected products, makes it possible to sort out imperfect products that have been identified by visual control and/or automated control means.

DETAILED DESCRIPTION OF THE INVENTION

Figure 1:
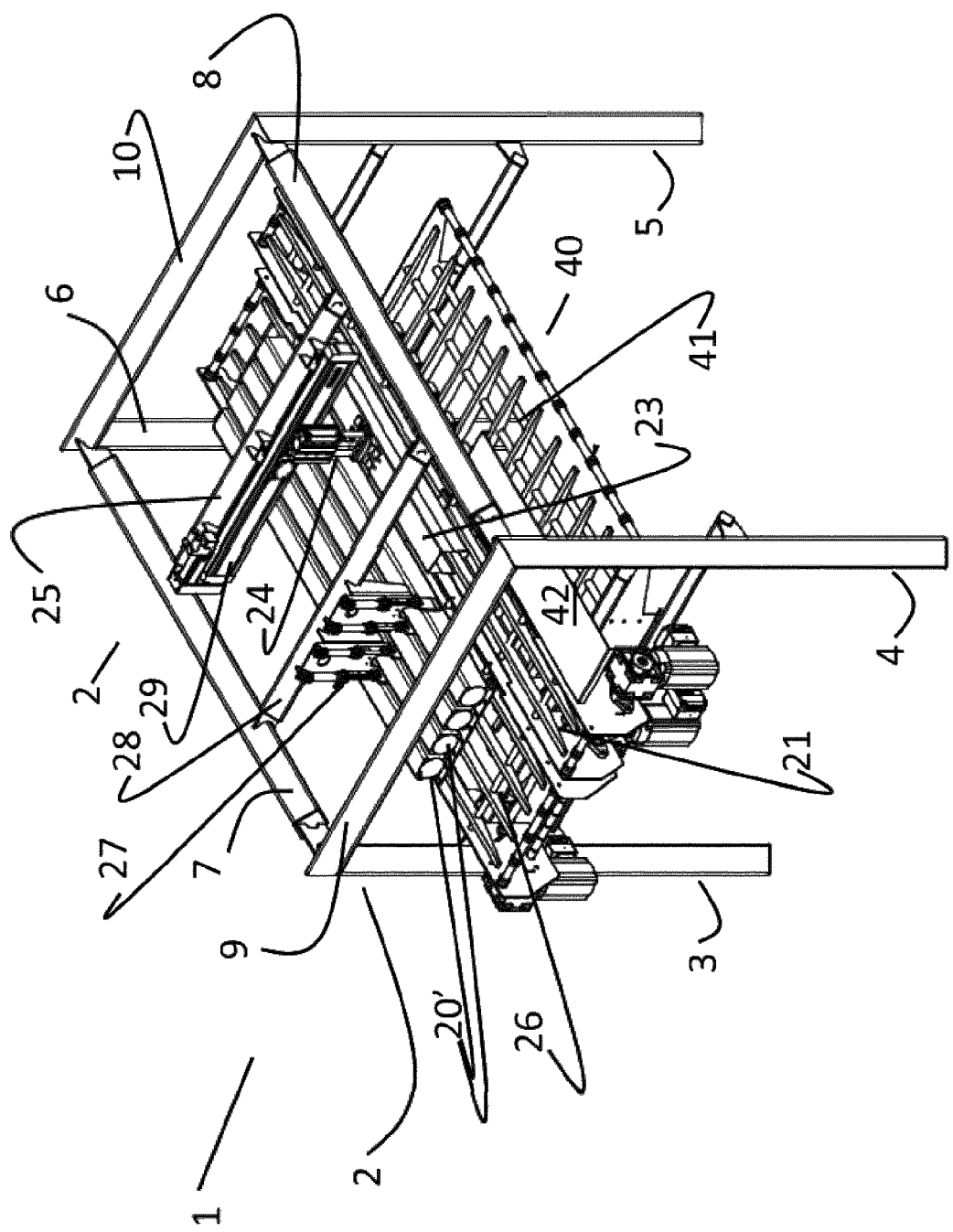
FIG. 1 is a perspective vied of a device according to the present invention.
Figure 2:
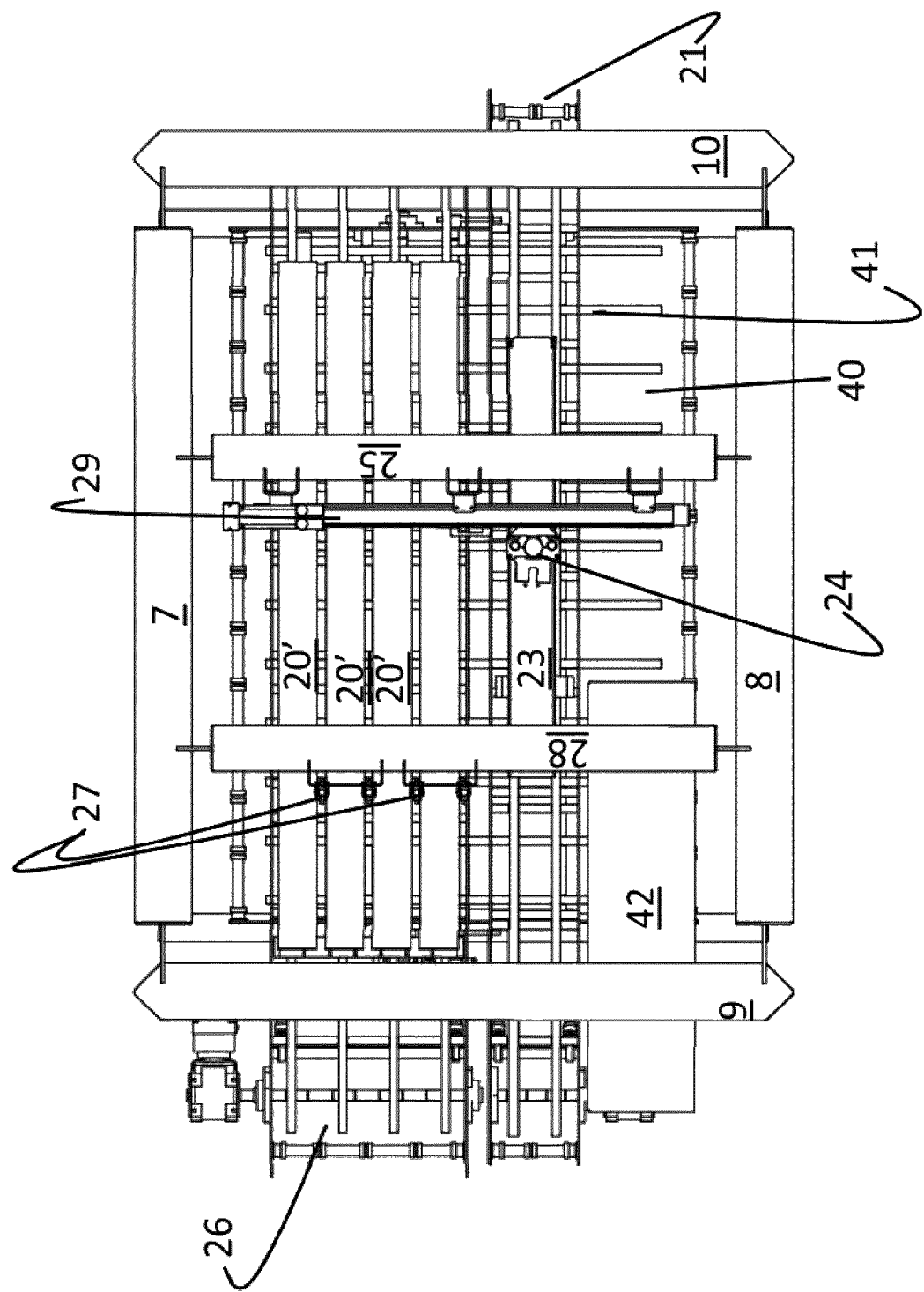
FIG. 2 is a bird's eye view of the device according to FIG. 1.
Figure 3:
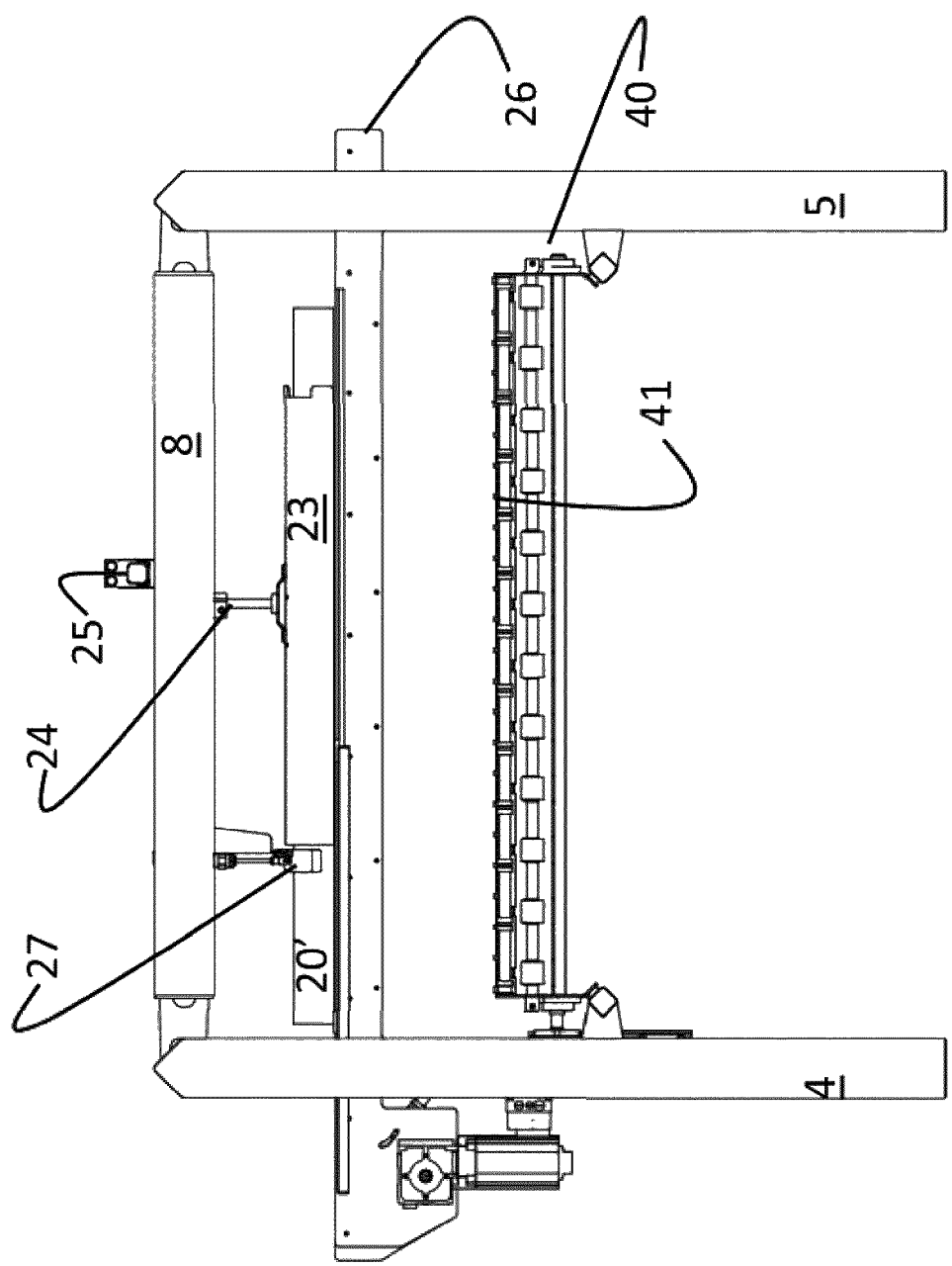
FIG. 3 is a side view of the device of FIG. 1, seen across the length axis of the articles being introduced into the device.
Figure 4:
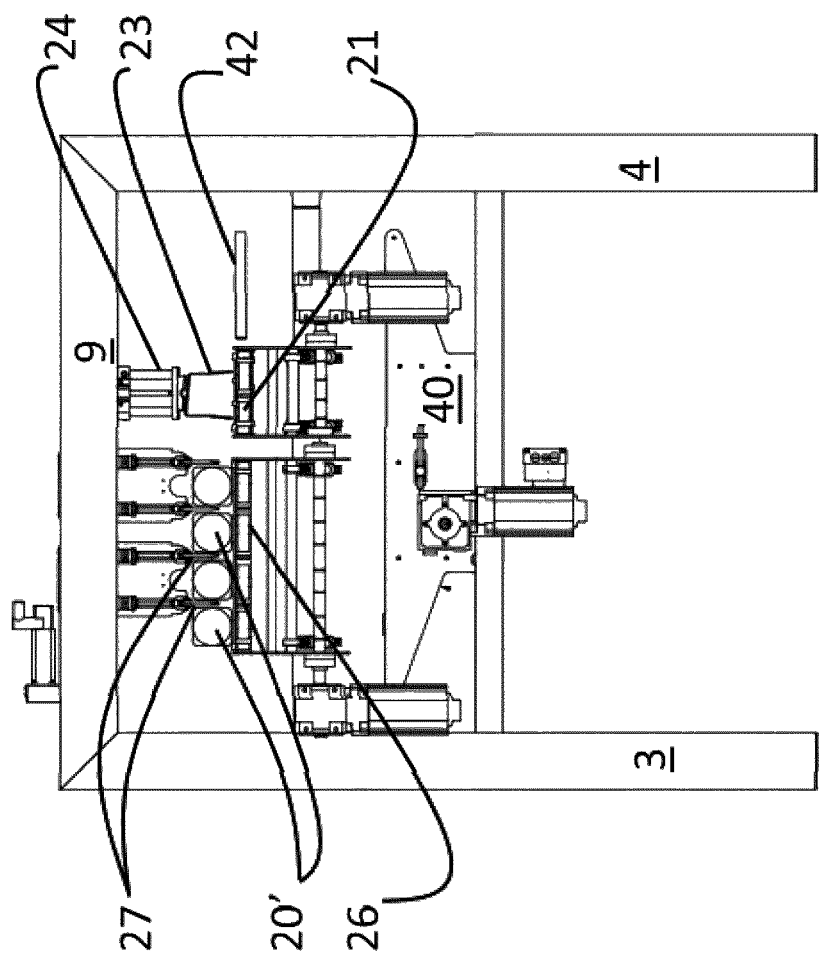
FIG. 4 is a side view perpendicular to the vied of FIG. 3.

FIG. 1 is a perspective view of an embodiment of the present sorting and alignment device 1. The present device 1 is arranged in a rack 2, comprising four legs 3, 4, 5, 6, longitudinal beams 7, 8, and cross beams 9, 10. The configuration of the rack is, however, not relevant for the present invention as the only requirement is that the rack suitably supports the sorting and alignment device, and does not disturb any required functionality thereof. The additional figures are added to illustrate parts of the present device from different views, and to see parts in one view that is hidden or not optimally shown in other views.

An incoming product conveyor 21 is arranged for receiving an incoming product 20. The incoming product conveyor is connected to the rack 2, via carrying beams 22. Incoming products may be introduced manually, or be automatically introduced. Before introduction the products are preferably peeled, either by a not shown automatic peeler or skin stripping arrangement, or by manual peeling or stripping. Not shown automatic control devices are preferably arranged to stop the incoming product when it has reached a predetermined position on the incoming product conveyor 21.

A displacement device 23 is provided for displacing the incoming product from the above mentioned predetermined position on the incoming product conveyor 21 onto alignment positions on a output conveyor 26 onto which two or more products 20' may be aligned, as will be further described below.

The illustrated displacement device 23 comprises a U-formed channel that is open downwards. The displacement device 23 is sideways displaceable as it is connected to a displacement track 29 arranged on an overlaying boom 25 arranged substantially traverse to the incoming product conveyor 21 and the output conveyor 26. The displacement of the displacement device 22 may be controlled by any suitable means such as a servo controlled linear unit, or a pneumatic or hydraulic controlled unit controlling the displacement along the displacement track.

A lifting device 24 is voided for lifting the displacement device from a position where the displacement device is lifted above any products being arranged in the sorting and alignment device, to a position where the displacement device may interact with a product.

When a product is to be introduced into the device, the displacement device 23 is preferably arranged above the incoming product conveyor 21, so that the incoming product is introduced into the displacement device so that the incoming product is, at least at a part of its total length, surrounded by the U-shaped channel when the products is stopped in the predetermined position mentioned above. The skilled person will understand that the illustrated displacement device 23 may be substituted by two or more displacement devices 23 arranged to interact with different positions along the length of the incoming product. The skilled person will also understand that the incoming product may be introduced into the present device and stopped at the predetermined position before the displacement device is lowered into a position where the product is at least partly surrounded by the displacement device.

As soon as the displacement device 23 is in a position interacting, or surrounding at least parts of the incoming product 20, the above mentioned means for sideways displacement along the track 29 may be activated to relocate the product from the incoming product conveyor 21, to an alignment position at the product output conveyor 26. As soon as the incoming product 201 is arranged in its alignment position, the displacement device 23 may be lifted to a position where it does not interact with the product, and the displacement device may be returned to a position above the incoming product conveyor to repeat the process. As illustrated, two or more products, such as four, may be aligned at the output conveyor 26 before being conveyed out of the device for further processing.

The displacement device is connected to the rack via one or more boom(s) 25. A track 29 designed to allow the displacement device to be shifted transversely, i.e. to be displaced substantially transversely to the length axis of the products as a miniature bridge crane, is connected to the boom. The skilled man will understand that the track 29 may be an integrated part of the boom 25, or may be a separate part connected to the boom. Lifting and lowering of the displacement device as well as the transverse displacement of the gripping device, is controlled by pneumatic or hydraulic cylinders, electrical motors, chains or the like.

During the displacement movement, the product will either roll (for products having a circular cross section) or slide towards the underlying structure. The skilled person will understand how to adopt the underlying structure to avoid obstructions that will represent a hindrance for the displacement.

Retractable guides 27 are preferably arranged as stoppers for the product. The illustrated retractable guides 27 are arranged on a guide boom 28 arranged above the alignment area. The retractable guides 27 may be retracted to allow for the displacement of the product from the incoming product conveyor to the alignment area. As soon as a new incoming product is placed onto the alignment area, one or more guides are lowered, to keep the product in place and function as guide(s) when the product is transported to the next unit by means of the outgoing product conveyors. The retractable guides may be operated by means for hydraulic cylinders, electrical actuators or any other suitable means.

The skilled person will understand that even though only one guide boom 28 and one set of retractable guides 27 are illustrated, two or more guide boom(s) and corresponding set(s) of retractable guides may be arranged to guide the product along the length of the product.

After the predetermined number of incoming products has been arranged in the alignment area, and the downstream unit is ready to receive new products, the outgoing products conveyor is started to transport the products simultaneously and parallel into the next unit. The next unit is normally a slicing machine to slice the food products before packing and distribution.

The positions of the retractable guides 27 may preferably be adjusted along the guide boom according to the dimensions of the incoming product. Accordingly, the gripping device may be replaced or adjusted to different dimensions of the product. The control of the positioning of the incoming product by the gripping device may also be adjusted correspondingly, to allow for using the same device for several product dimensions, both in length and diameter/cross section measures.

All incoming products are preferably controlled visually by an operator and/or automatically for defects and/or remains of the skin due to incomplete peeling, that are incompatible with the quality requirements for the finished product. An incoming product that is not accepted by the control is moved to a position for non-compatible products, to be collected and removed from the device. A collector 40 is preferably arranged under the conveyor for incoming products and under a reject position 41. A trapdoor 42 may be arranged in the reject position 41.

In the illustrated embodiment the reject position 41 is arranged parallel to the incoming product conveyor at the opposite side relative to the alignment position. If a product is to be rejected, the gripping device will grip the product, transport the product to the reject position and release the product. If a trapdoor is present, the product will be temporarily placed onto the trapdoor. The trapdoor may then be opened at a convenient time to allow the rejected product to be collected at the underlying collector. If no trapdoor is present, the rejected product will fall directly down into the collector from the gripping device. A trapdoor is presently preferred as it allows for a better controlled process and does not expose the gripping device to unwanted forces, and possibly detrimental forces, caused by uneven diameter/dimension of the product.

Preferably, a rejected product conveyor is provided in the collector 40 for transporting rejected products out of the collector so that the rejected products may be taken care of. Alternatively, the collector may be a conveyor that immediately transports the rejected product out of the present device.

The skilled person will understand that the presently described reject position may be different from the position described above. A reject position arranged between the incoming product conveyor and the outgoing product conveyor is also a possibility. The reject position is described as a trapdoor. The reject position can also comprise a conveyor for transporting rejected products directly out of the device and into a rejected product collection device.

The displacement device has been described above as a U-shaped elongated body being arranged above the conveyors 21, 26, having a dimension allowing the U-shaped body to surround at least parts of the product along the length thereof. The skilled person will understand that the presently described displacement device may be substituted by gripping devices gripping about the product, or sucking devices using vacuum to control the contact between the displacement device and the product, to perform the displacement. Gripping or sucking displacement devices may allow lifting of the product from the incoming position to the alignment position, which may be an advantage in some situations. Lifting and sucking devices do, however, ad complexity to the product. Additionally, the above described displacement device is easy to clean, a feature that is important for food processing equipment.

The invention claimed is:

1. A device for alignment of elongated food products to be further processed, the device comprising:

an incoming product conveyor for transporting incoming elongated products into the device;

a displacement device being displaceable arranged on a displacement track for relocating the incoming products from the incoming product conveyor onto an outgoing product conveyor having capacity for arranging two or more incoming products side by side before transporting the two or more incoming products simultaneously out from the device;

wherein the displacement device is arranged above the incoming product conveyor and comprises a lifting device for lifting the displacement device to a position such that the displacement device does not interact with the incoming product when the incoming product is arranged in an alignment position; and a plurality of retractable guides arranged above the outgoing products conveyor, wherein the plurality of retractable guides are arranged to guide the incoming individual product on the outgoing product conveyor.

2. The device according to claim 1, wherein the plurality of retractable guides are retractable to allow relocation of the incoming product from the incoming product conveyor to the outgoing product conveyor using the displacement device.

3. The device of claim 1, wherein the displacement device comprises a control device designed to control relocation of incoming products to be rejected in a reject product position to be collected by a reject collector for transport out from the device.

* * * * *